US 6,567,518 B1

(12) United States Patent
Weir

(10) Patent No.: US 6,567,518 B1
(45) Date of Patent: May 20, 2003

(54) METHOD OF FIELD PROGRAMMABLE GATE ARRAY CONFIGURATION

(75) Inventor: Stephen Weir, Petaluma, CA (US)

(73) Assignee: Teltronics, Inc., Petaluma, CA (US)

( * ) Notice: Subject to any disclaimer, the term of this patent is extended or adjusted under 35 U.S.C. 154(b) by 0 days.

(21) Appl. No.: 09/343,695

(22) Filed: Jun. 30, 1999

Related U.S. Application Data

(62) Division of application No. 09/145,780, filed on Aug. 28, 1998.

(51) Int. Cl.[7] .................. H03K 19/173; G06F 7/38; G06F 17/50
(52) U.S. Cl. ..................... 379/333; 326/38; 716/16
(58) Field of Search ................ 379/333; 326/27, 326/49, 37–39; 703/13; 370/503; 365/185.29, 185.33, 218; 375/295, 296; 711/170; 716/16

(56) References Cited

U.S. PATENT DOCUMENTS

| | | | |
|---|---|---|---|
| 4,688,212 A | | 8/1987 | MacGinitie et al. |
| 5,255,264 A | | 10/1993 | Cotton et al. |
| 5,544,163 A | | 8/1996 | Madonna |
| 5,602,723 A | | 2/1997 | Takahashi et al. |
| 5,712,628 A | * | 1/1998 | Phillips et al. ........... 340/10.51 |
| 5,732,250 A | * | 3/1998 | Bates et al. ............. 710/60 |
| 5,794,033 A | * | 8/1998 | Aldebert et al. ......... 713/100 |
| 6,034,548 A | * | 3/2000 | Churcher et al. ........ 326/27 |
| 6,058,263 A | * | 5/2000 | Voth ..................... 703/25 |

FOREIGN PATENT DOCUMENTS

| | | |
|---|---|---|
| EP | 0687122 | 12/1995 |
| GB | 2008895 | 11/1978 |

OTHER PUBLICATIONS

M.L. Le Gac, et al. "Une Nouvelle Etape Pour Alcatel E10: Connexion et Commande 0CB283." Commutation et Transmission, vol. 13, No. 2, Jan. 1, 1991, pp. 69–76. Paris, France.

* cited by examiner

Primary Examiner—Benny Q. Tieu
(74) Attorney, Agent, or Firm—Duane Morris LLP

(57) ABSTRACT

A modular digital telephone system and method featuring a universal telephony shelf adaptable for incremental expansion of legacy telephone switches and as a building block in the construction of new telephony switches. The shelf includes identification and connectors for shelf pairing, and is adapted to receive redundant power supplies, plural line cards, and either a peripheral shelf interface unit or a switch array card upon which is located a flash memory device utilized for reconfiguration purposes of a resident field programmable gate array.

7 Claims, 20 Drawing Sheets

FIGURE 4A

POWER | TSA (SDU)
POWER | TSA (SDU) | 16 LINE CARDS

FIGURE 4B

POWER | SDU | SDU | 16 LINE CARDS

METHOD OF FIELD PROGRAMMABLE GATE ARRAY CONFIGURATION

This application is a Division of application Ser. No. 09/145,780 filed Aug. 28, 1998.

BACKGROUND OF THE INVENTION

Digital telephone systems are well known and have replaced the prior analog systems. All telephone switching is now accomplished digitally.

Prior art digital switches, such as the Harris Corporation 20-20® switch, are used to accomplish the routing of telephone calls, both voice and data, within a private system such as a private branch exchange ("PBX") and/or into a publicly switched telephone network ("PTSN"). Such switches are also used to provide enhanced services such as call forwarding, call waiting, conference, transfer, etc.

Such switch systems are generally installed in a cabinet configured to receive a number of telephony shelves, including:

a Common Control shelf for microprocessors, memory and floppy and hard disc drives. This shelf is responsible for call control, call tracking and database management.

Telephony Control shelves for providing timing and control of the telephony switching. This shelf includes Peripheral Interface Units ("PIU"s) which provide the connections to the service units.

plural shelves for Telephony Interface Units or line cards ("TIUs") which contain the trunks, lines and service units. Each of these PIU units typically services 512 telephony ports.

The communication between the Common Control and Telephony Control shelves to each of the plural TIUs in prior art switches has been by flat cable. In addition, the distance over which such cabling can be run is relatively small, e.g., 13 feet, requiring that all components of the system be co-located. It is an object of the present invention to provide a novel telephone system and method in which the amount of cabling is substantially reduced and the distance substantially increased, facilitating the location of various components of the system in widely spaced locations.

Known systems have employed specialized shelves, and the lack of component interchangeability has been an impediment to expansion of installed switches. It is accordingly an object of the present invention to provide a novel system and method utilizing modular components changeable in function by the exchange or addition of cards within the shelf.

Telephone switches generally take the form of rows and columns of shelves and maintenance and repair requires the precise identification of the shelf. It is an object of the present invention to provide a novel telephony shelf which displays an identification number.

Often, the hoods of the connectors used for the line cards of a telephony shelf are made by different manufacturers and come in non-uniform sizes and may appear in a row of 16 across the back of the shelf. The prior art has attempted to maintain the connections of the hooded connectors individually, typically by screws into the line card although Velcro straps have been used. The time and trouble to ensure closure often means that closure is not assured. It is accordingly another object of the present invention to provide a novel mechanical connector for the line cards which operates on all of the connectors present without regard to variations in size and shape or the number thereof.

In known systems, the existence of a fault is displayed on a console. However, the potentially wide distribution of the components of systems requires that each location within the system be apprised of faults within the system, and the severity thereof, without regard to the location thereof. Accordingly, it is another object of the present invention to provide a novel alarm system which provides notice of selected system faults, and the severity thereof, at each location in the system.

In known systems, the power supply cards, because of the large components mounted thereon, required considerable lateral space within the shelf, especially in a redundancy configuration requiring the insertion of two power supply cards. It is accordingly another object of the present invention to provide a novel power supply card packaged to require only one half of the vertical space of previously known cards, thus facilitating redundancy by the vertical stacking of power supply cards without sacrificing lateral space needed for line cards.

Existing systems, installed for a relatively small number of telephony ports, often have excess port service capacity but the addition of ports is very difficult. It is yet another object of the present invention to provide a novel Peripheral Transport Unit with plural Peripheral Access Modules, whereby the number of ports services by legacy switches may be readily expanded.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWINGS

FIGS. 4A, 4B, and 4C are functional block diagrams illustrating the redundancy available at various levels utilizing the universal telephony shelves of the present invention.

DESCRIPTION OF PREFERRED EMBODIMENTS

The present system is a modular system which lends itself readily to expansion. The system itself may be understood more readily with a prior understanding of the various components as described below.

Table Of Contents

I. Universal Telephony Shelf
   A. General
   B. Timing and Switch Array card (FIG. 5)
      1. Local Port Interface (FIG. 5)
      2. Peripheral Access Module (FIGS. 6–8)
      3. Tone and Conference Unit (FIG. 5)
      4. Time Switch Unit (FIG. 5)
      5. Scan and Signal Unit (FIG. 5)
      6. Type Byte Scanning
      7. Arbitration (FIGS. 9, 10)
      8. Serial Firmware Download (FIG. 11)
   C. Shelf Driver Unit (FIG. 12)
      1. SDU Display (FIGS. 14, 15)
      2. Digital Clock Synchronizing (FIG. 13)
   D. Alarm Board (FIGS. 1B, 1C)
   E. Power Supply Packaging And Thermal Management (FIGS. 4A, 4B)
   F. Connector Locking Mechanism (FIGS. 14, 15)
II. Typical Installation And Redundancy (FIGS. 3, 4)
III. Expansion of Legacy Switches

I. UNIVERSAL TELEPHONY SHELF

A. General

Figure 1A:
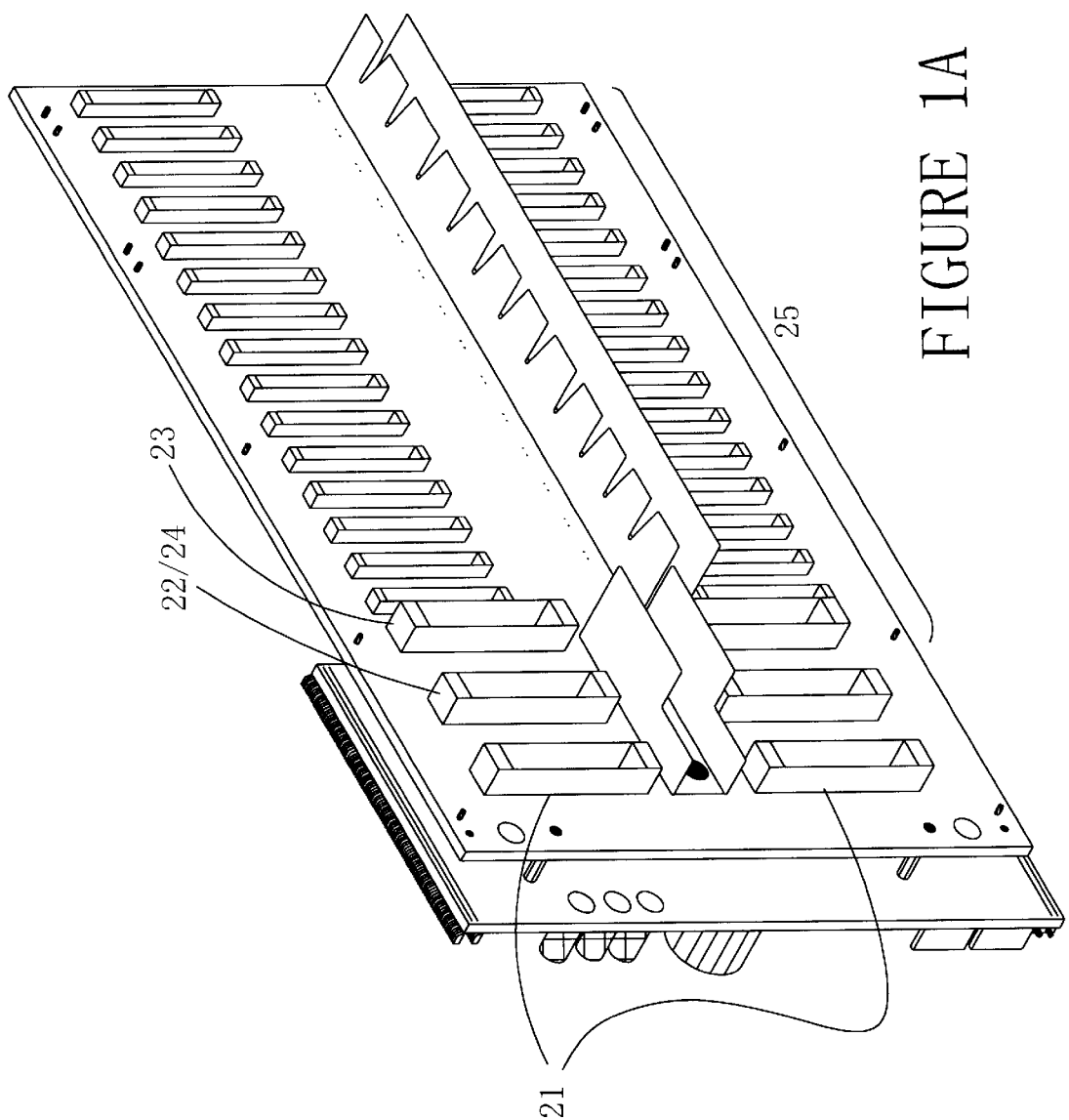
FIGS. 1A and 1B are pictorial views of one embodiment of the Universal Telephony Shelf ("UTS") of the present invention.
Figure 1B:
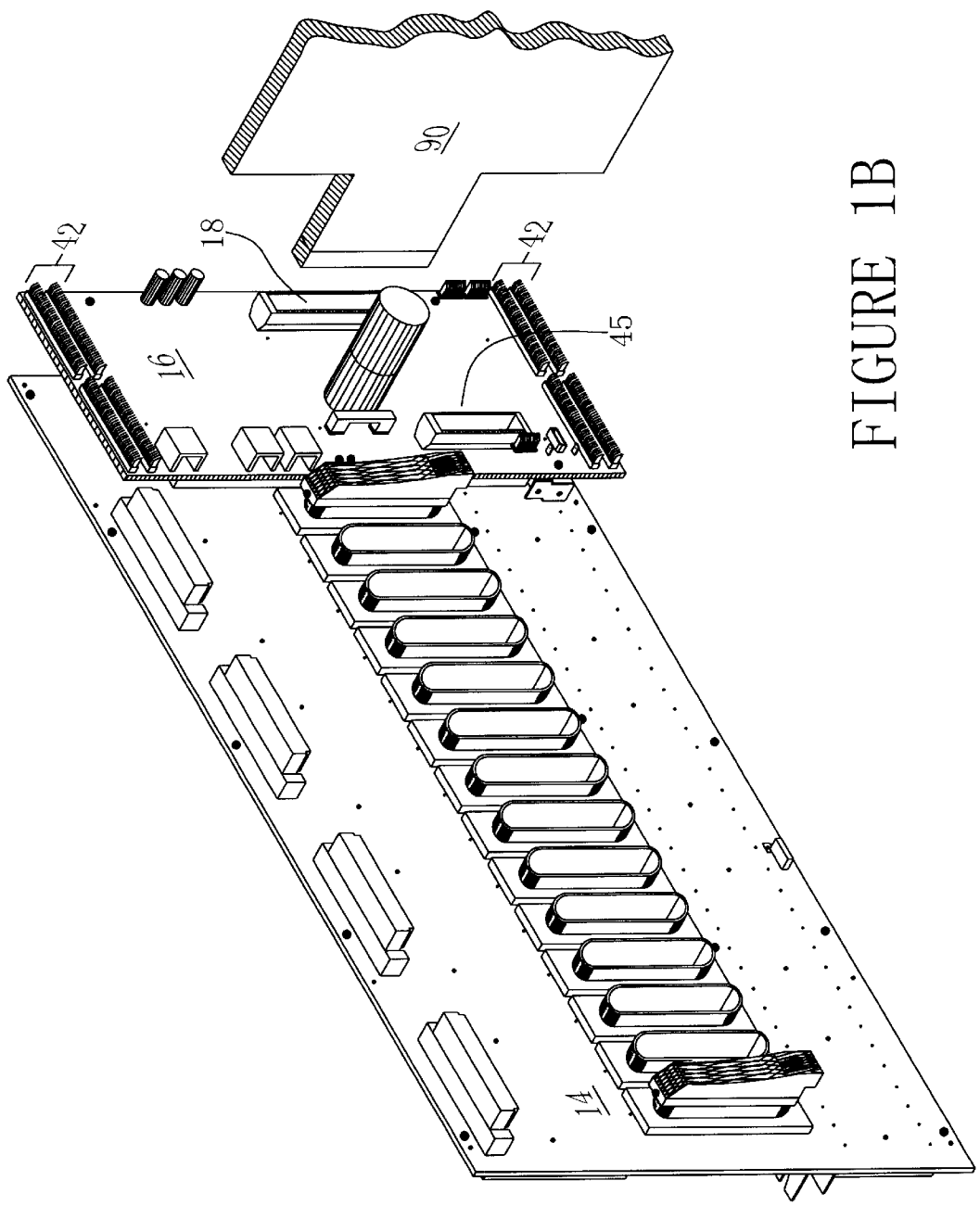

FIGS. 1A and 1B illustrates one embodiment of the Universal Telephony Shelf (UTS) 20 of the present invention. As explained in more detail infra, the function of the individual UTS is determined by the cards inserted therein, and a UTS may therefore be used for either common control or peripheral equipment.

The UTS 20 is a modular component, with each UTS supporting 256 telephony ports. The UTS backplane 14 (not visible in FIG. 1A) has 20 slots of which, as shown in FIG. 1A, the first two slots 21 are reserved for the power supplies. These first two slots are divided into two vertical half-slots, each half-slot having half the height of the shelf with the second half reserved for a redundant power supply. The third slot 22 of the UTS provides a common connector for insertion of either a Timing and Switch Array ("TSA") for common control equipment use or a Shelf Driver Unit ("SDU") for peripheral equipment use. Both the TSA and SDU cards are capable of supporting up to 512 telephony ports. The fourth slot is reserved for a central processing unit ("CPU") 23 if the third slot is occupied by a TSA and is generally vacant when the third slot is occupied by an SDU. The remaining sixteen slots 25 are used by Telephony Interface Units ("TIU"), each providing service to 256 telephony ports.

Figure 1C:
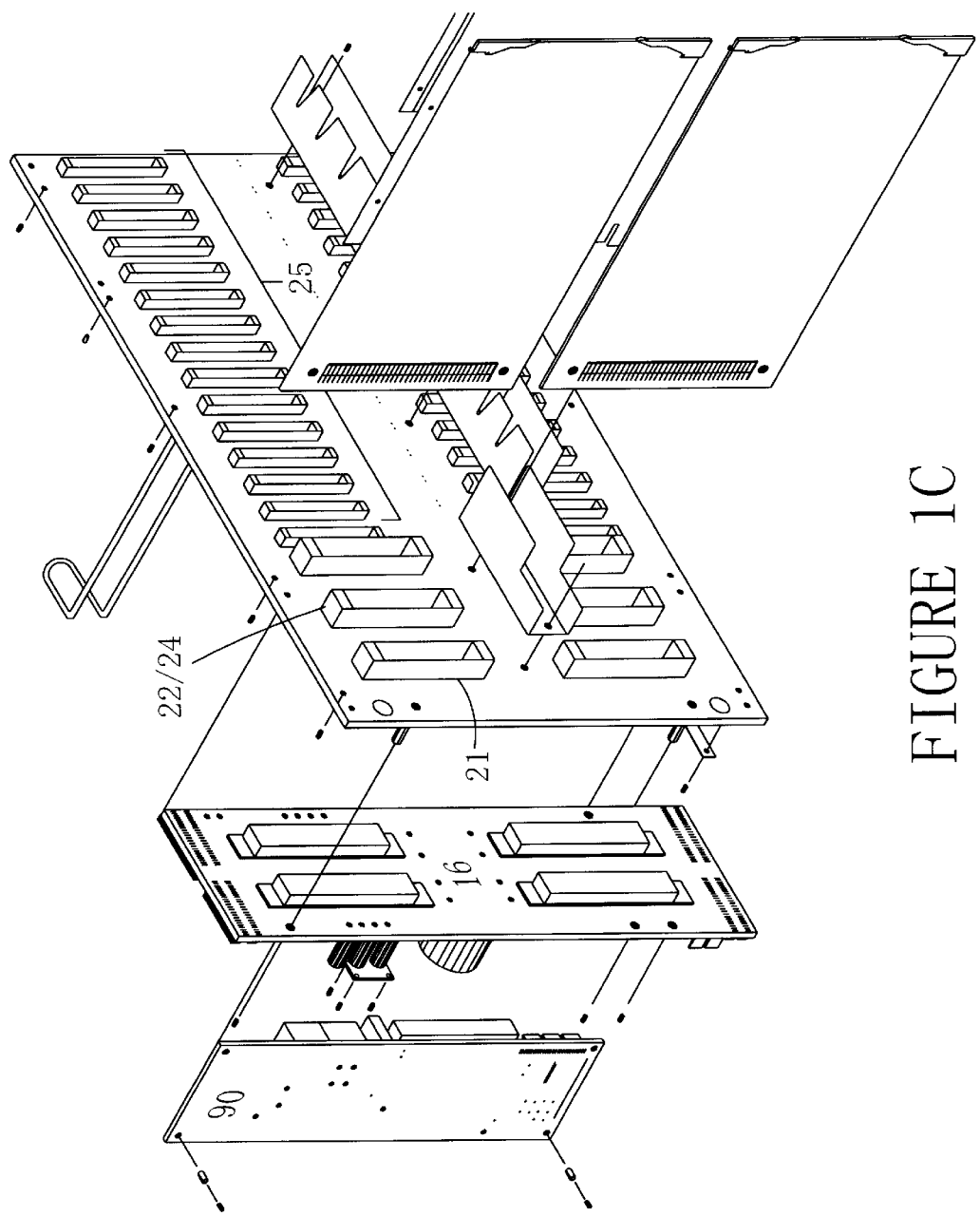
FIG. 1C is an exploded pictorial view of the embodiment of the UTS shown in FIGS. 1A and 1B with the subplane and selected printed circuit boards attached.

As illustrated in FIGS. 1B and 1C, an Alarm Sub-Plane 16 may be attached to the UTS back plane 14 providing additional card real estate for an alarm card connector 18, various power connectors (not shown), shelf pairing cable connectors 42 and connector 45 for cabling redundant TSAs or SDUs.

Figure 2A:
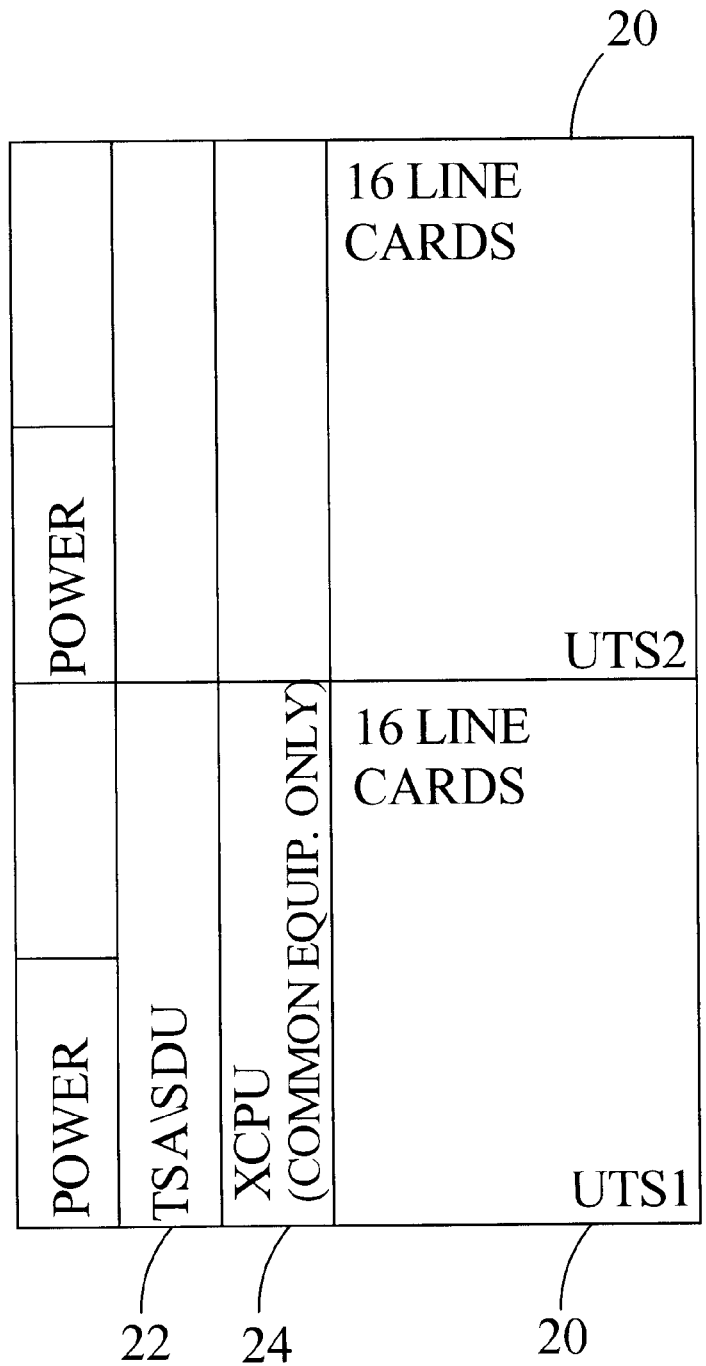
FIGS. 2A and 2B are functional block diagrams illustrating the pairing of UTSs incorporated in a second embodiment of the present invention.
Figure 2B:
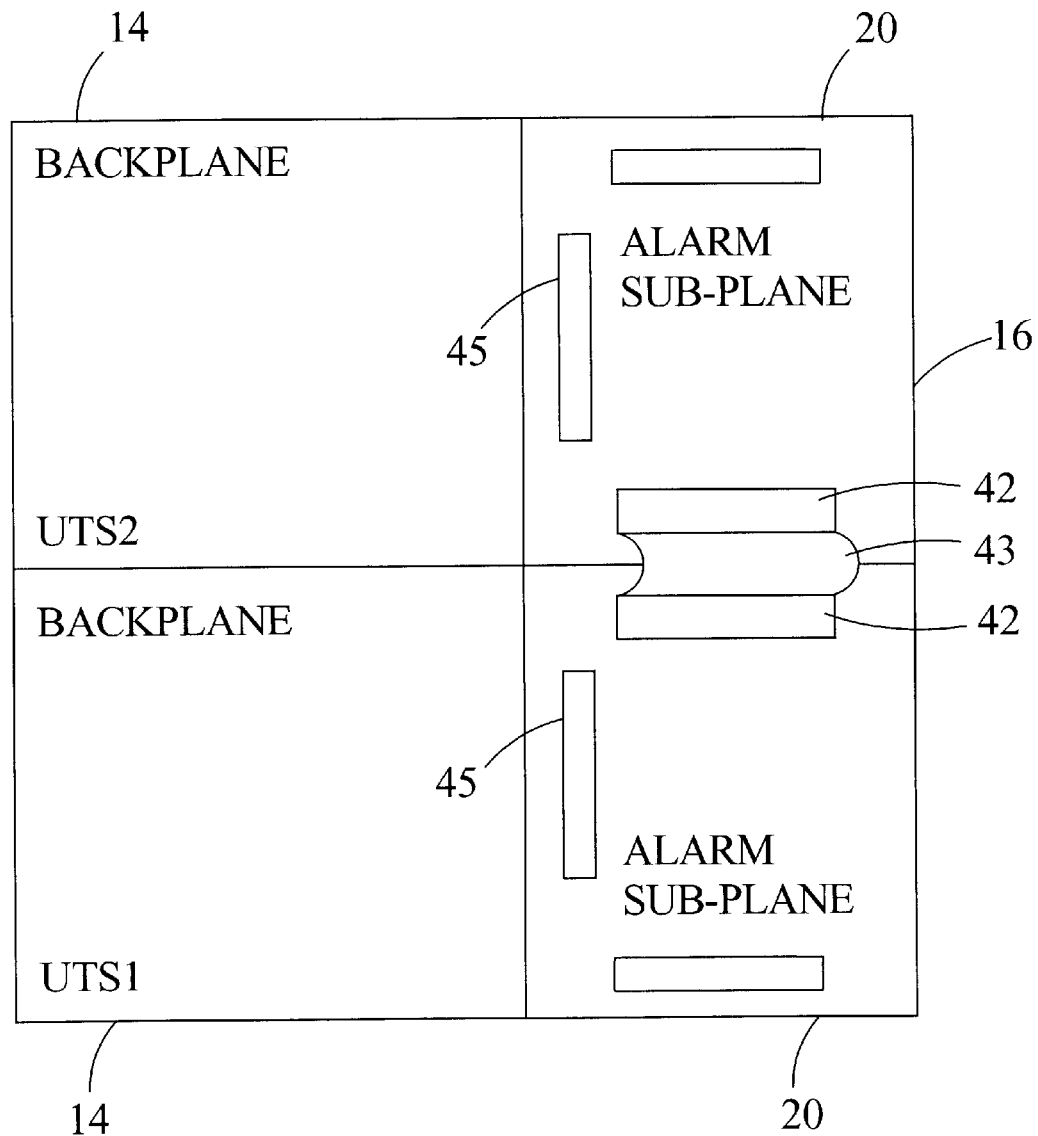

As illustrated in FIGS. 2A and 2B, two UTSs 20 may be paired to provide 512 port common equipment or peripheral equipment modules by shelf pairing cable 43 establishing back plane-to-back plane connection through the connectors 42 conveniently located at both the top and bottom of the alarm sub-plane 16 so that any shelf may be paired with the shelf above or beneath it in the cabinet. This pairing configuration exploits the 512 port capacity of the TSA and SDU cards.

B. The Timing and Switch Array Card

Figure 5:
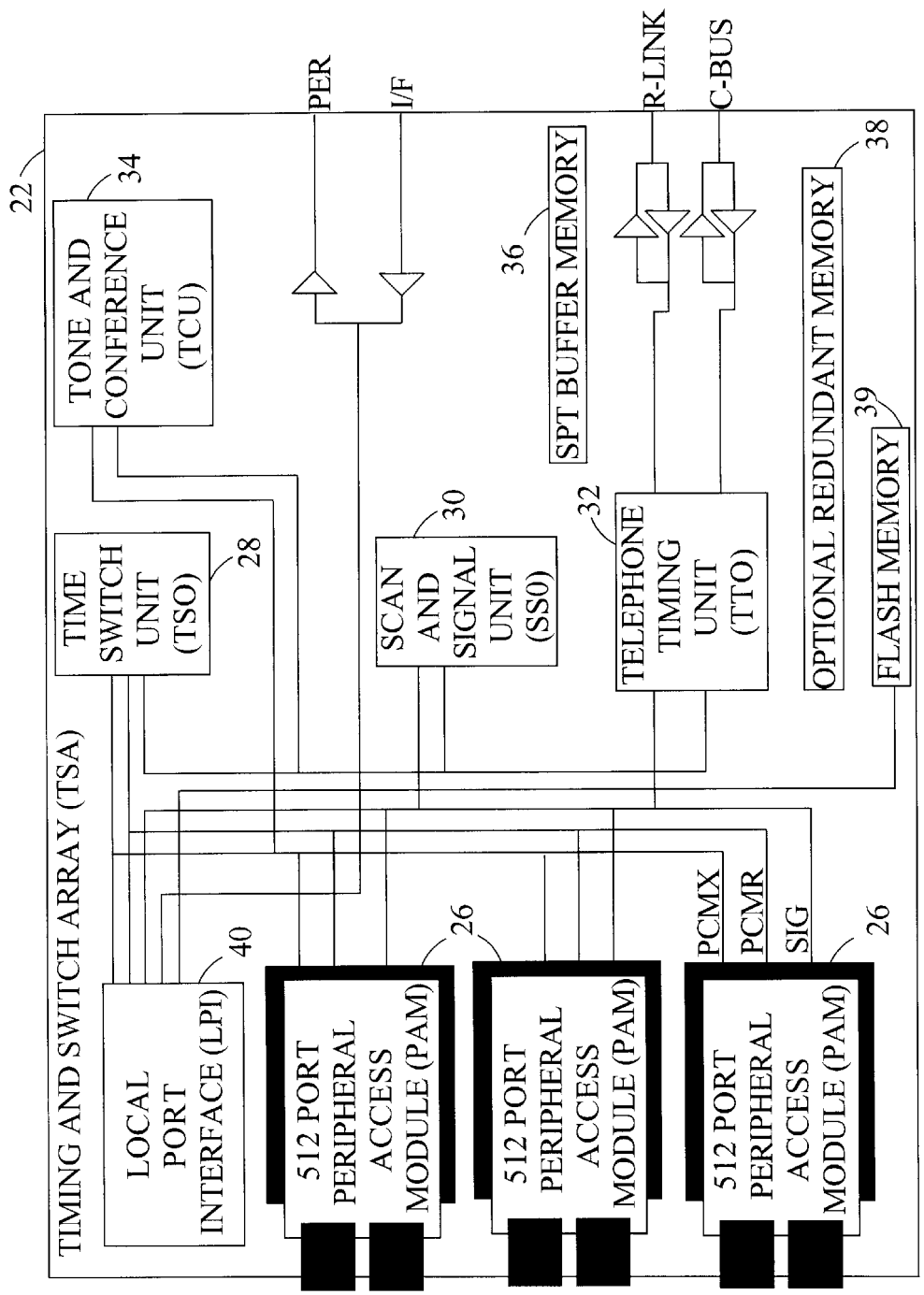
FIG. 5 is a functional block diagram illustrating one embodiment of the Timing and Switch Array Card of the UTS of FIGS. 1 and 2.
Figure 6:
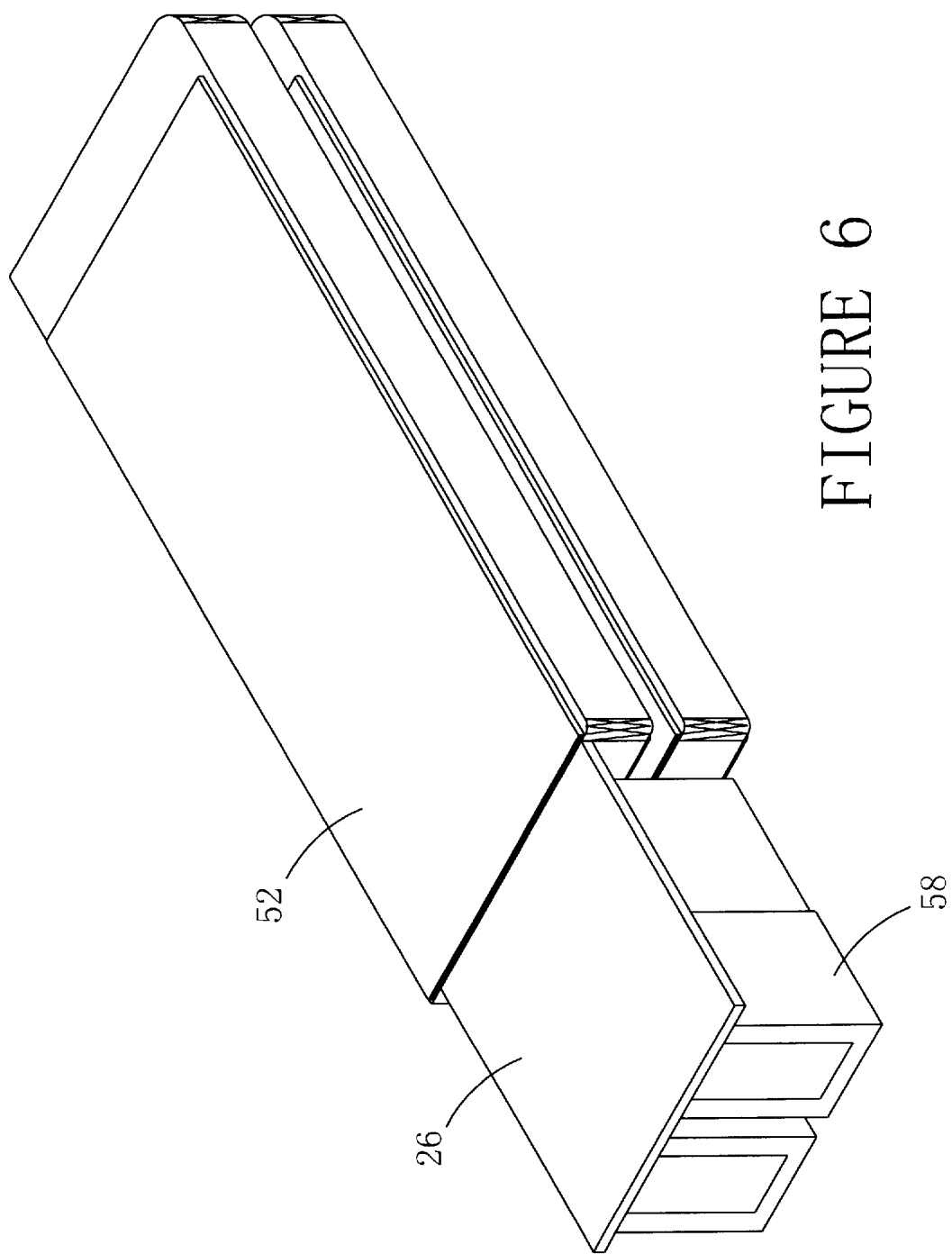
FIG. 6 is a pictorial representation of the PAM connection to the TSA card via a standard PCMCIA connector for one embodiment of the present invention.

The TSA card 22 illustrated in FIG. 5 is a complete PBX switch on a single card, requiring only a host computer, power supply, and peripheral cards in a suitable enclosure to be fully functional.

The TSA card 22 includes a Time Switch Unit ("TSU") 28 which performs PCM switching, and functions as a peripheral port to receive PCM data on each of the 2048 peripheral ports supported by the TSA card. It is a non-blocking 4096 input to 2048 output timeslot switch, and switches 4096 input timeslots from the PCMX, and PCMEX busses in any combination to 2048 output timeslots on the PCMR bus.

The TSU 28 also provides electrical and mechanical interface for a Local Peripheral Interface ("LPI") 40 and three optional Peripheral Access Modules ("PAM") 26.

The LPI 40 is discussed in greater detail below. It performs two major functions on the TSA card 22, i.e., peripheral card slot interface for the local shelf (or shelf pair) and alarm board interface for the local shelf. The LPI 40 multiplexes, rate converts, and demultiplexes data for each of the 16 local port groups which it serves and presents peripheral timing consistent with the Harris 20-20 telephony bus.

The PAM 26 is also discussed in greater detail below. Each of the PAMs may function to transport 512 ports of PCM formatted data, associated signaling and overhead to another UTS shelf or shelf pair.

With continued reference to the TSA card 22 of FIG. 5, the Scan and Signal Unit ("SSU") 30 provides signal scanning and Signal Packet Transfer ("SPT") buffer support for all 2048 possible peripheral ports, shelf, and link alarm functions. The Telephony Timing Unit ("TTU") 32 provides several overhead functions including host computer interface, redundant common control interface, and backplane identification, as well as all clock and synchronization signals required by the TSA card 22. The timing references may also propagate to the peripherals located in the shelf via the backplane and to peripherals located on other shelves.

The TSA card 22 may also contain a Tone and Conference Unit ("TCU") 34 which provides basic tone and conference functions. The TCU 34 utilizes a timeslot switch (4352 timeslot input, 512 timeslot output) which is independent of the TSU 28. This switch can direct any source timeslot to each of the 256 tone ports and direct any source timeslot to each of the 256 conference bridge inputs.

A minimum configuration TSA card 22 also includes Signal Packet Transfer ("SPT") buffer memory 36 and flash memory 39 for 512 ports connected to the local shelf or shelf pair. However, a minimum configuration TSA need not contain any of the PAMs 26 as earlier described. The minimum configuration TSA card 22 supplies all switching and support functions needed for a 1–512 port, non-redundant switch, and the PAM modules are options for installation in the field or in the factory.

1. Local Port Interface

Figure 1D:
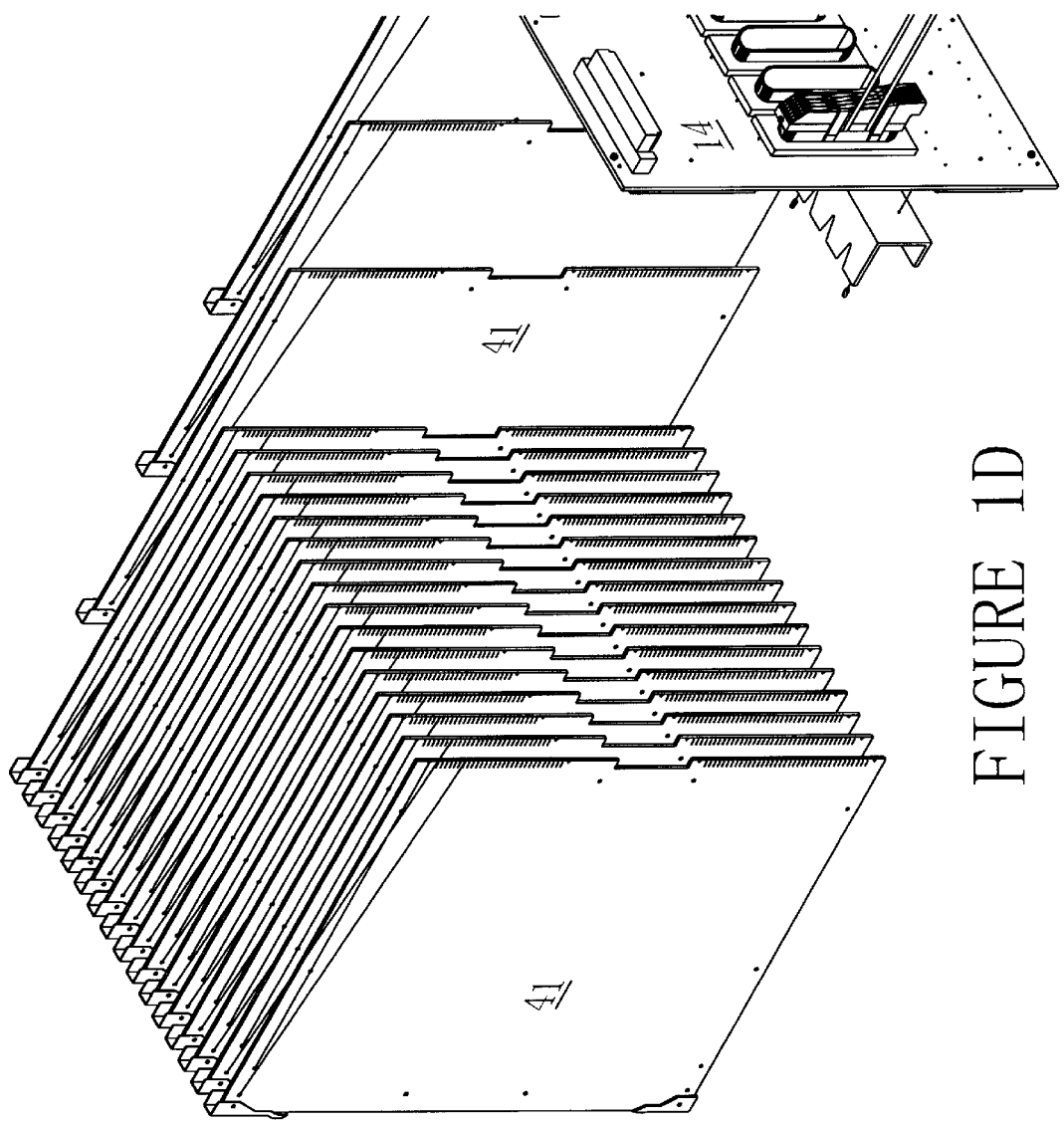
FIG. 1D is a pictorial view of the insertion of the line cards into the slots on the shelf backplane.

The LPI 40 shown on the TSA card of FIG. 5 interfaces to the sixteen line cards 41 of the shelf shown on FIG. 1D and to an alarm card 90 on the shelf via the back plane. The LPI 40 multiplexes, rate converts, and demultiplexes data from the PCMR, and SIGR busses to PCMRX and SIGRx on each of the 16 local port groups which it serves. The LPI 40 collects a total of 16 PCM bytes, one per port group, and four signaling bytes, one for each signaling type: Control, Out0, Extend, and Out1, over a 3.92 usec period.

In the transmit direction, the LPI multiplexes transmit PCM data from sixteen port groups onto the PCMX bus port group timeslots 0–15. The LPI multiplexes signaling data onto STATUS, IN0, TYPE, and IN1 during cell 0 of each signaling block.

The LPI 40 supports redundant TSA operation. In a redundant configuration, switchover between the LPI functions of two TSAs 22 are fully synchronized to within +/−28 nsec's of each other as measured at the peripheral backplane. Further, switchover between TSAs 22 occurs only at distinct points in the PCM frame. The TSA 22 which is transitioning from master to slave releases the peripheral busses, six 32.768 MHz clock cycles after the rising edge of CLOCK. The TSA 22 which transitions from slave to master, drives the peripheral busses starting five 32.768 MHz clock cycles after the rising edge of CLOCK.

A redundant configuration requires a TSA card on each of two common controls and a redundant set of shelf interface cables. An LPI 40 drives the peripherals to which it is connected, if and only if: 1) the host telephony controller is ACTIVE; 2) the host telephony controller enables the LPI, and 3) no other LPI retains control of the telephony busses.

2. Peripheral Access Module

Figure 7:
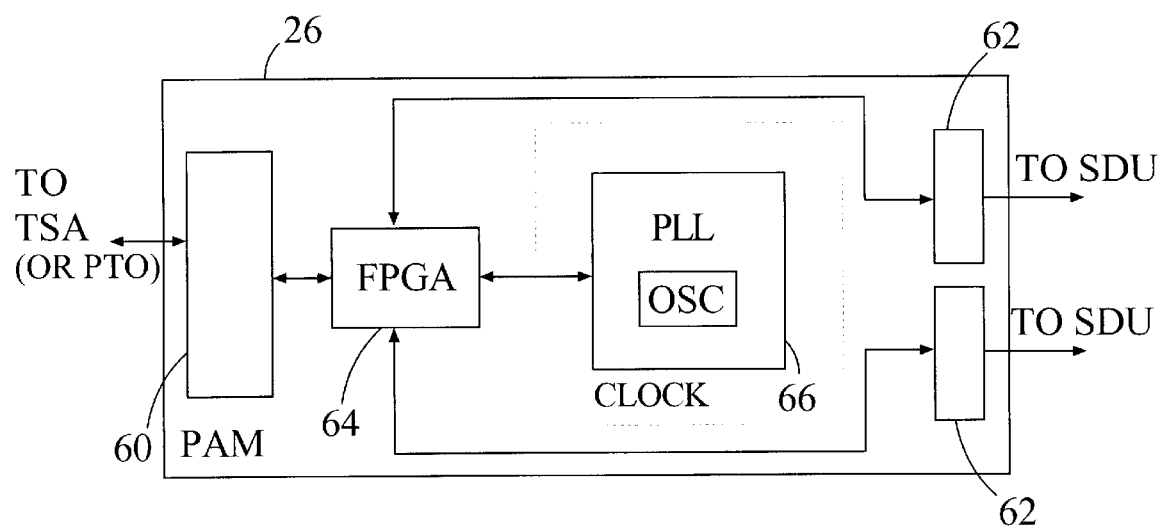
FIG. 7 is a functional block diagram illustrating one embodiment of the Peripheral Access Module of the TSA card of FIG. 5.

The PAM 26 provides transport interface between 20-20 TSA and the SDU cards located in UTS peripheral shelves. The PAM 26 mounts on the TSA card 22 in one of three dedicated expansion slots. As shown in FIG. 7, external connections to the PAM include: P1 host connector 60 and two RJ45 Serial S-Link connectors 62, with each serial interface transporting all of the information necessary to support 256 full-duplex PCM channels, associated signaling, and support functions for a stand-alone shelf. The PAM interfaces locally to the TSA card through a single, 68 pin PCMCIA connector which provides power, ground, and all data signals used by the PAM common control interface. Other components comprising the PAM include an FPGA 64 and a PLL 66 for generating clocking functions.

The PAM multiplexes PCM from the PCMR bus, signaling and overhead information from the SIG bus with an internally generated frame synchronization code. Peripheral PCM, and signaling occupy ten of twelve bytes per block. The remaining two bytes are overhead. The PAM passes all PCM and SIG bytes between the TSA and the SDU without alteration. In the downstream direction from the TSA towards the SDU, the PAM substitutes timing information for part of the overhead bytes supplied by the TSA. In the upstream direction to the TSA from the SDU, local status information is substituted.

PAM modules may support either a copper or fiber optic communication medium. The copper PAMs can each connect to one or two UTS shelves located up to 100 meters from the TSA card while the fiber optic PAM can increase this distance to about 9 kilometers. The structure of the two PAMs have been modeled to be interchangeable and to efficiently utilize the available packaging space.

Figure 8:
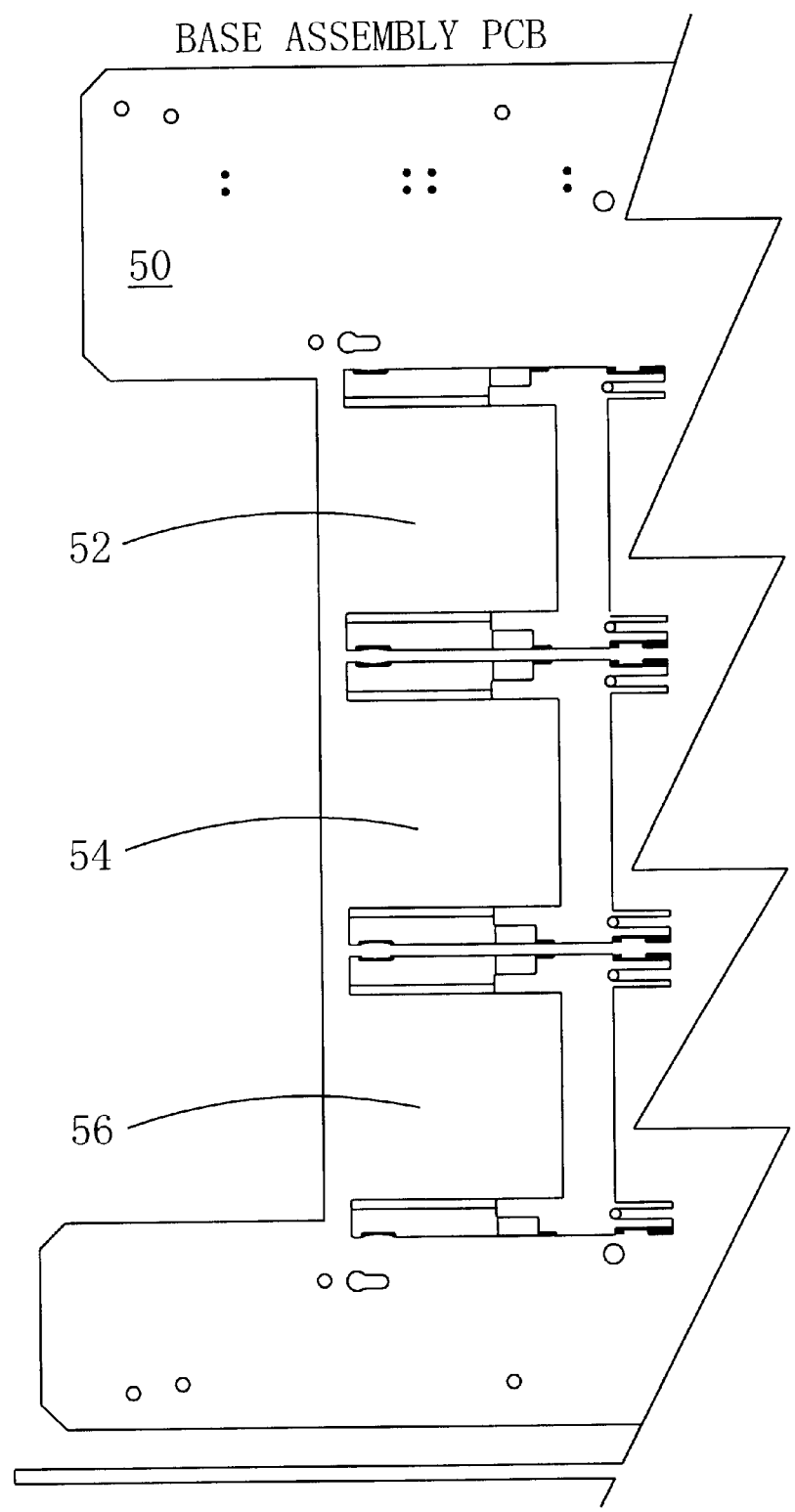
FIG. 8 is a pictorial representation of the TSA card of FIG. 5 showing the installation of three PCMCIA connectors for the PAMs of FIGS. 6 and 7.

As shown in FIG. 8, a printed circuit board (PCB) 50 on which the PAMs reside (i.e., TSA card 22) may include three conventional two-slot PCMCIA connectors 52, 54 and 56. Because of the thickness of the components 58 of the PAM (see FIG. 6), the normal insertion of the PAM into the PCMCIA connector would interfere with the placement of a card adjacent to the TSA. To prevent this interference, the PCB is notched at the entry of the connectors and the PAM is inserted in an inverted fashion into the top slot of the PCMCIA connector. In this way the spacing allotted to the TSA card slot is efficiently utilized.

To implement the insertion of the inverted PAM into the standard PCMCIA connector requires the periphery of the PAM to be altered to conform with the connector.

3. Tone and Conference Unit

The TCU 34 of FIG. 5 includes a tone generator capable of 256 independent tones based in RAM. The tone generator has a total tone wavetable space of 59 K bytes. Any single tone may occupy up to 32,767 bytes. The aggregate storage for all tones must be less than or equal to 59 K bytes. The TCU 34 functions as a 256 bridge circuit input, 256 conference sum output unit. Conference outputs are participatory, or eavesdrop, on a timeslot by timeslot basis. Tones occupy the first 256 ports of the TSA map. Conference bridge circuits occupy the second 256. Tone and conference circuits maintain a nearly identical software interface to the 20-20 MNP. The principal exception is a smaller valid source address range.

4. Time Switch Unit

The TSU 28 of the TSA card of FIG. 5 is embodied in the combination of an FPGA, Switching RAM, and Attenuation RAM. Two eight bit parallel PCM busses source the TSU input; PCMX, from the peripheral ports, and PCMEX from the TCU, and future on-board expansion, the busses operate synchronously at 16.384 MHz, supplying 2048 PCM timeslots each. The TSU function switches 4096 input timeslots from the ~PCMX, and ~PCMEX busses in any combination to the 2048 output timeslots on the ~PCMR bus. The TSU includes thirty-two attenuation steps in each of four translation pages of a RAM downloadable attenuation table. Timeslot switching is selectable as full-frame, or half-frame, on an output timeslot, by output timeslot basis.

The host computer establishes each one-way connection with a source address pointer (two bytes) for the destination in the connection memory (A-RAM). An eight bit attenuation register establishes COMPAND law conversion, and attenuation gain or loss.

5. Signal Scanning Unit

With continued reference to FIG. 5, the SSU function provides signal scanning and SPT support for all 2048 possible peripheral ports. In addition, the SSU function provides signal scanning for shelf, and link alarm functions. The basic SPT configuration supports SPT to all 2048 ports. SPT could be chainable in multiples of 1/2/4/8/16 8 Kbps sub channels per logical channel.

6. Type Byte Scanning

A card inserted into a universal connector may provide an identification number to the system to identify the card type. A change in the card ID number may occur when an error occurs within the card. Prior art systems detect this change in card ID number during a periodic auditing process performed by the CPU. In a UTS system, the SSU of the TSA includes a new signaling function, TYPE byte scanning, with an associated monitoring register for each port in the Port Structure Array and a new event, which detects changes in card ID number in real-time. A change to a card ID number is reflected in an event FIFO located on the TSA which notifies the CPU of the change.

It is an advantage of the present system that this notification functions as an interrupt removing the delay in detection associated with the auditing process. The change in the card ID number may be an indication, among other things, of a blown fuse, a change in state (e.g., from initializing to active), or a change in function (i.e., multifunction card).

7. Arbitration

As illustrated in FIG. 5, the TSCPAD bus is a multiplexed address/data bus connecting the sub-units TTU, SSU, TSU, and TCU (i.e., field programmable gate arrays) on the TSA card 22. The bus may also be utilized by the Voice Combiner Unit (VCU) and any expansion modules connected through the lower slot of the PAM dual slot PCMCIA connector (i.e., lower slot connects to bus arbitration lines).

Figure 9:
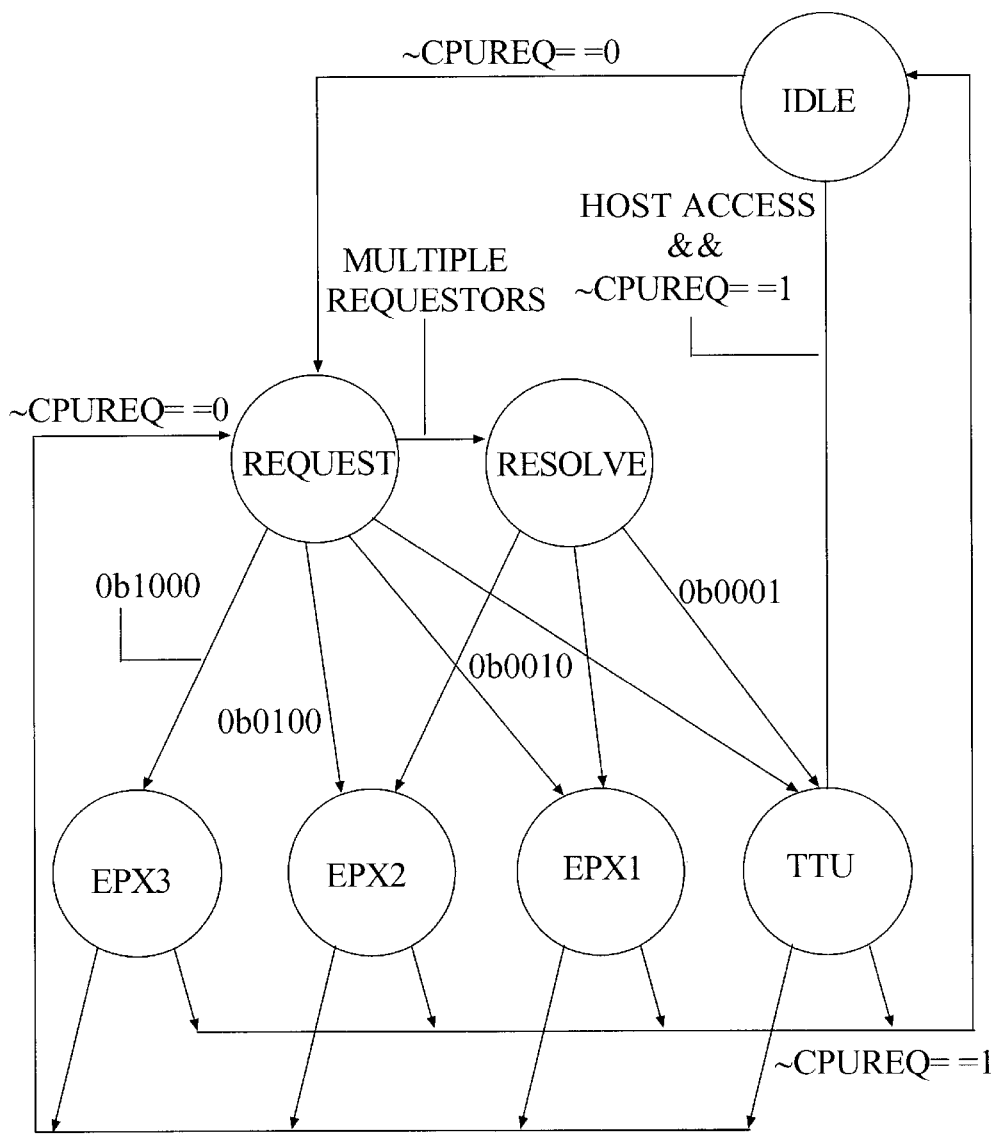
FIG. 9 is a state diagram for one embodiment of the present invention illustrating an arbitration scheme for resolving contention for the TSCPAD bus located on the Timing and Switch Array card.

The arbitration mechanism implemented to resolve contention for the bus by the sub-units for one embodiment of the present invention is illustrated in FIG. 9. Generally, the arbitration mechanism provides a priority based scheme which may be limited by the number of consecutive accesses (e.g., four consecutive accesses by any one requester) or a time parameter (e.g., access grant for four microseconds to same requester). To request bus access, the requester asserts the active low line CPUREQ on the TSCPAD bus, and if there is no contention for the bus, the request for access is granted. If multiple requests for bus access are made, an arbitration cycle may or may not be necessary before access is granted depending on the timing of the requests and the requesters involved.

As shown in FIG. 9, the highest priority requester, host access via the TTU, is granted bus access without regard to the other requesters when the request is made either prior to or coincident with the other requests (i.e., ~CPUREQ=1), providing near zero arbitration delay. If the TTU request for access is made subsequent to other requests (i.e., ~CPUREQ=1), an arbitration cycle (RESOLVE) is required. During the arbitration cycle, the request of the lowest priority requester EXP3 is not considered.

Figure 10:
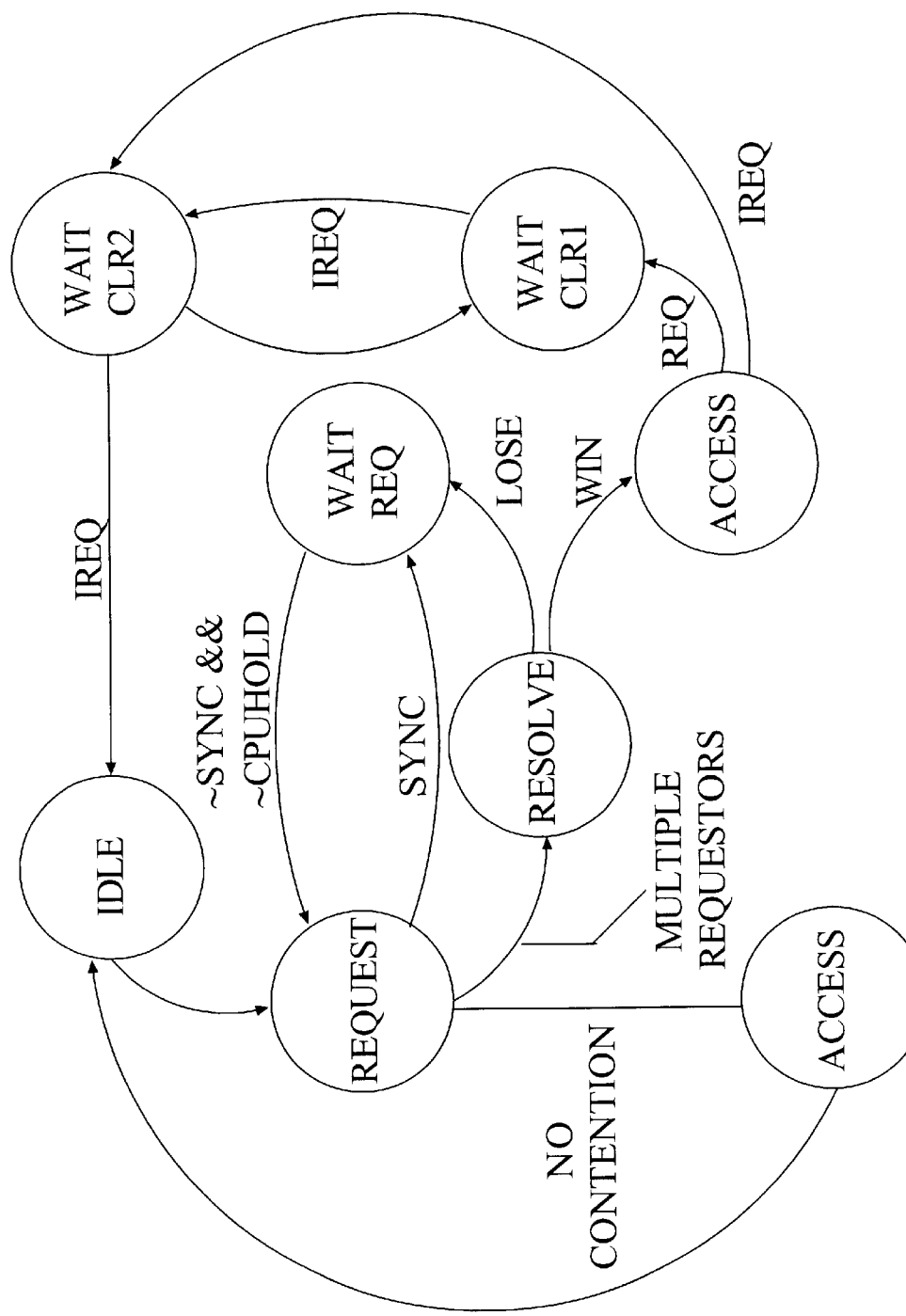
FIG. 10 is a state diagram of the arbitration scheme of the embodiment of FIG. 9 further illustrating a requester's ability to retain bus access.

FIG. 10 elaborates on the arbitration mechanism and further illustrates a requester's ability to retain bus access. A bus requester may retain the bus for the lessor of four consecutive accesses or four microseconds by asserting a second arbitration line ~CPUHOLD of the TSCPAD bus. A requester which accesses the bus following a contended request cannot reassert for subsequent access until at least two consecutive 61 nsec intervals in which ~CPUREQ is negated. At the end of any requester data transfer accesses, the next arbitration state is determined by the state of ~CPUREQ. ~CPUREQ asserted indicates that either a contended arbitration occurred, or another requester became active during the just completed data transfer cycle. The arbiter returns to the REQUEST phase. ~CPUREQ negated indicates that no data transfers are pending so the arbiter returns to the IDLE state.

8. Serial Firmware Download

With continued reference to FIG. 5, the flash memory device 39 located on the TSA card is a non-volatile device containing the programming configuration for each of the field programmable gate arrays ("FPGA"s) located on the TSA card 22. Since the FPGAs are static RAM devices which lose their programming when the system is powered down, the FPGAs must be reconfigured by the flash memory device when power is restored to the system.

Various methods have been used to program the flash memory devices with the various FPGA configuration information. The flash memory devices may be programmed and soldered to the circuit boards during manufacture. Reprogramming the devices, however, is difficult due to the effort needed to remove and reconnect the memory devices to the circuit board. This problem can be overcome at the expense of providing sockets for the memory devices. Further, the removal/insertion of the memory device from/into the socket may damage the device or other circuitry on the circuit board.

Figure 11:
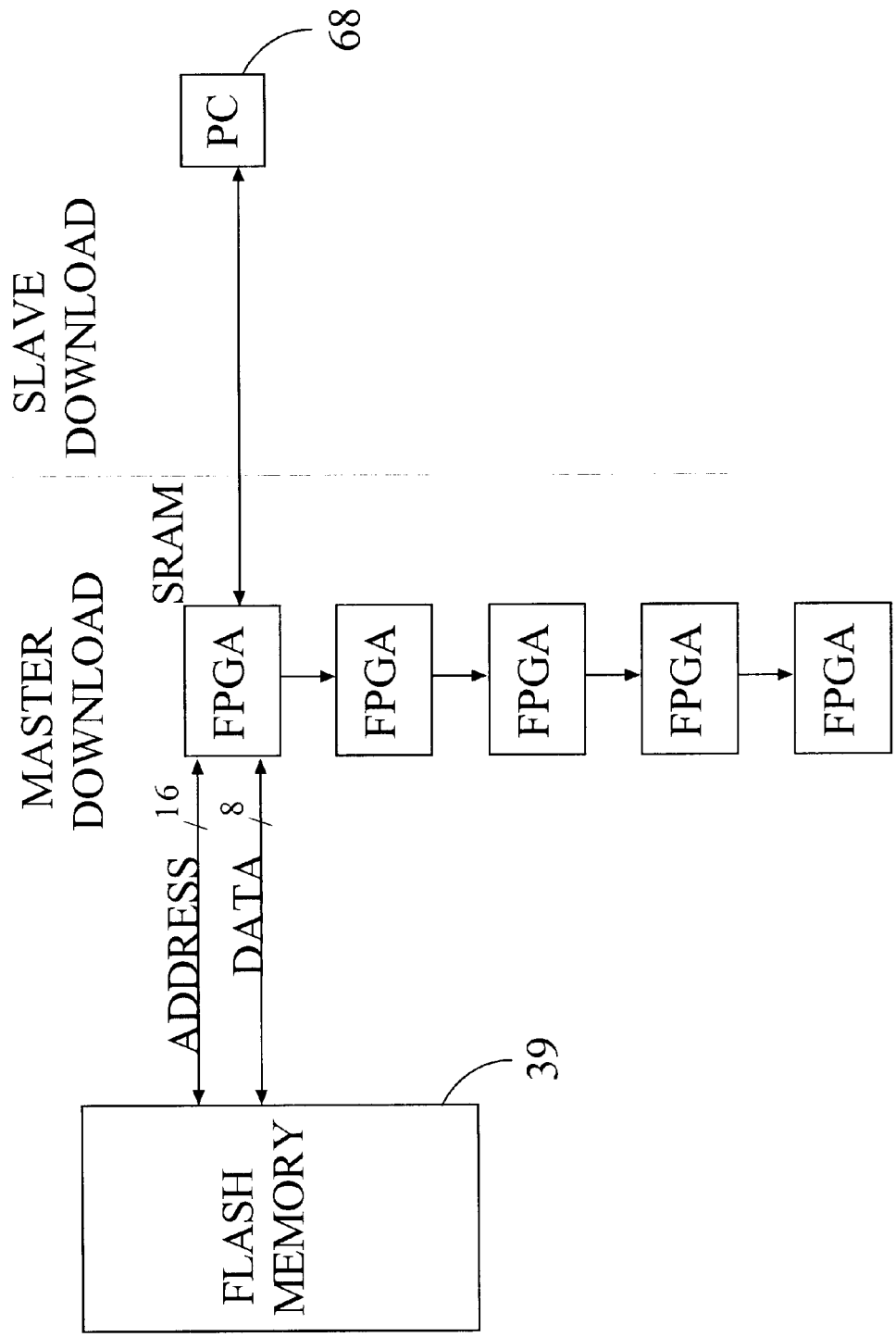
FIG. 11 is a functional block diagram illustrating means used for programming of a flash memory device found on cards in the shelf of the present invention.

One embodiment of the present invention illustrated in FIG. 11 incorporates a novel way for programming these flash memory devices obviating the problems of the prior art. One of the FPGAs is chosen to be used to program the TCU, TSU, SSU, TTU, or the LPI functions (normally the LPI FPGA). This FPGA is configured from a serially connected external computer. 68 to function as a UART (serial to parallel data conversion) and a flash memory controller (i.e., state machine providing control signals, e.g., write, address, data, clocking).

After configuring the FPGA, the external computer 68 provides the programming data for the flash memory device to the FPGA. The programming data is then converted into a parallel data stream by the FPGA/UART and communicated along with the necessary control signals from the FPGA to the flash memory device.

Once the programming of the flash memory device is completed, the flash memory configures the FPGAs, including the re-configuration of the UART/state machine FPGA, to perform their designated functions, The capacity of the programming FPGA to function as a UART/state machine is expunged by the reconfiguration.

C. Shelf Driver Unit

Figure 12:
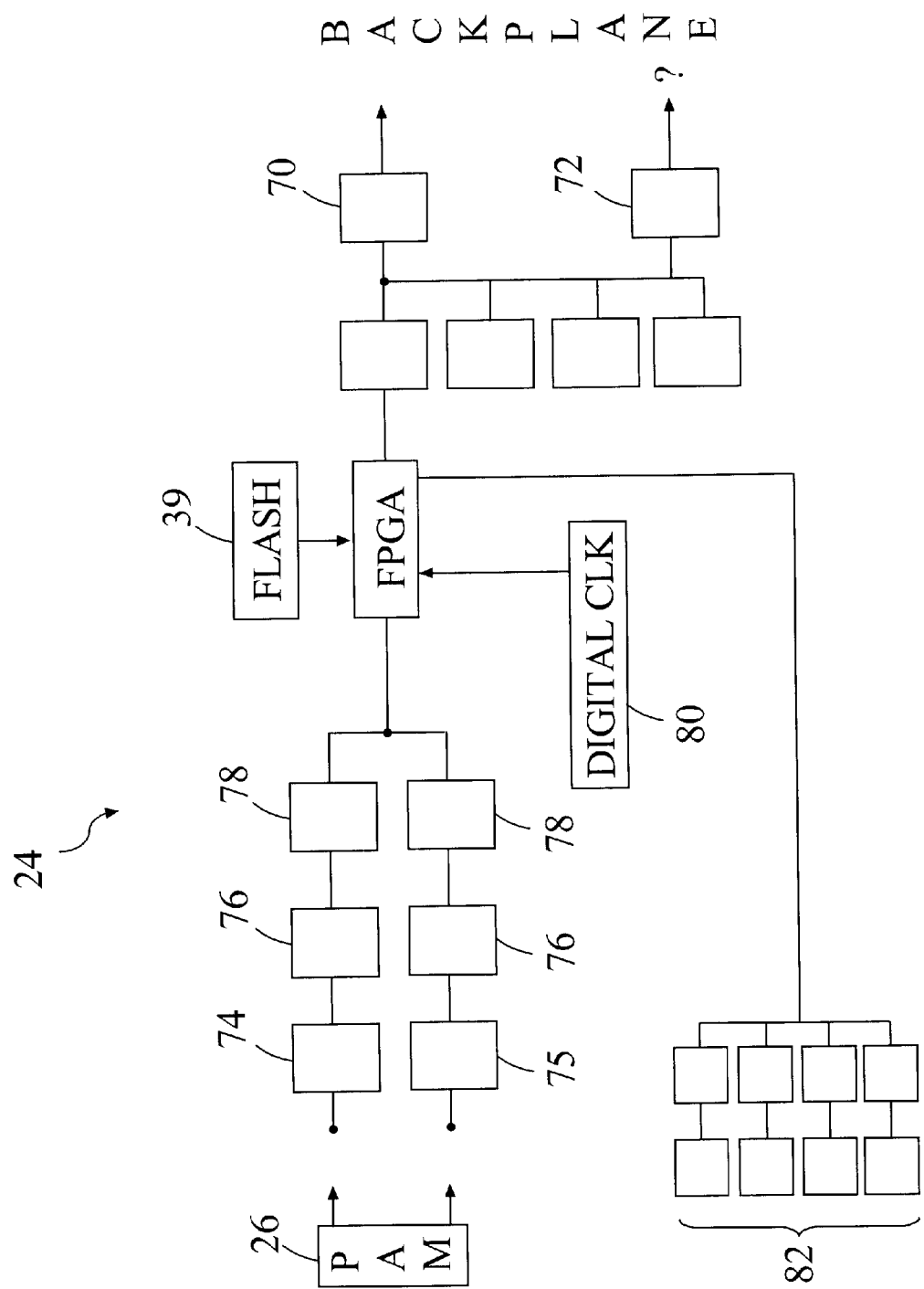
FIG. 12 is a functional block diagram of the Shelf Driver Unit of FIGS. 1 and 2.

The SDU 24 may be inserted into any UTS in lieu of a TSA card and provides the transport interface needed between the TSA (UTS Common Control) and the peripheral shelves. As shown in FIG. 12, connections to the SDU 24 include: P1 backplane connector 70, P2 backplane connector 72, and J1 (PRImary) & J2 Serial PLink (EXPansion) connectors 74, 75 through conventional transformers 76 and line drivers 78. The SDU 24 interfaces to peripheral cards in the same backplane, and optionally, in a second backplane in a paired configuration via ribbon cable as earlier described in connection with FIG. 2B. The P1 backplane connector 70 supplies all operating current for the SDU.

Figure 13:
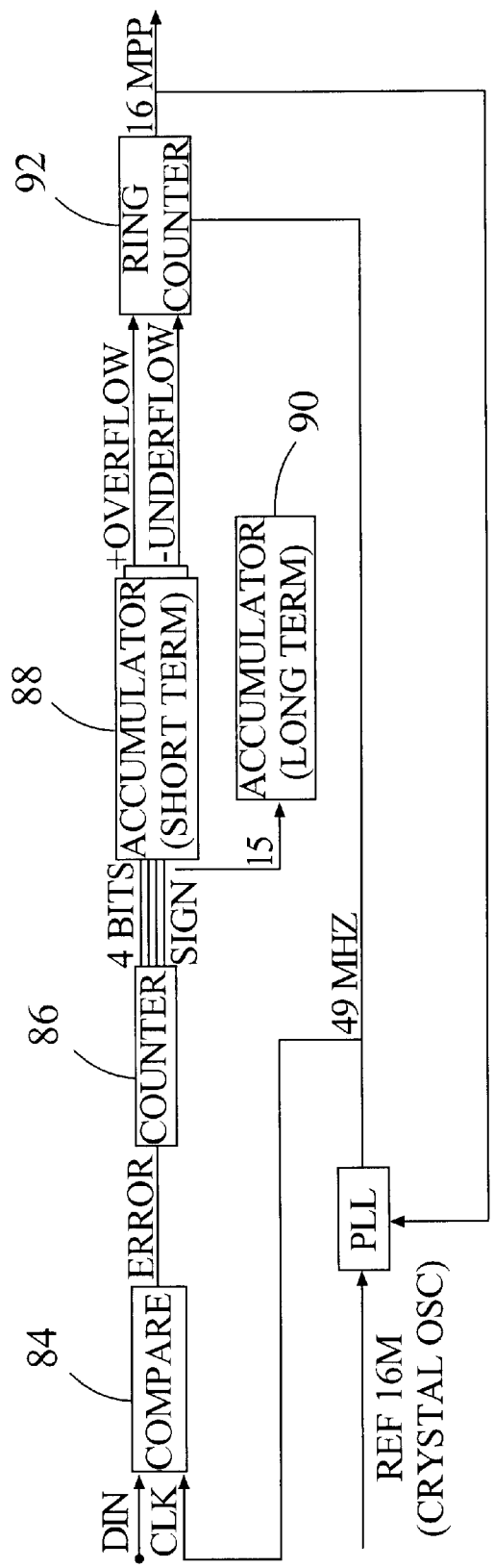
FIG. 13 is functional block diagram of the digital clock synchronizing mechanism of FIG. 12.

With continued reference to FIG. 12, the FPGA receives digital clock information from a clock 80 as shown in more detail in FIG. 13, and provides a digital display 82.

Of the two serial connectors, PRI is the first port used on every SDU. It connects the first 256 ports supported by the SDU 24 to the common control. In systems with paired shelves, these ports will reside on the lower shelf of a shelf pair. The EXP port connects the second 256 ports supported by the SDU 24 to the common control. These are usually located on the adjacent peripheral shelf located above the shelf in which the SDU 24 resides. In systems with paired shelves, these ports reside on the upper shelf of a shelf pair.

The SDU 24 presents peripheral backplane timing consistent with Harris 20-20 switch. Each Serial S-Link interface includes two transmit and two receive-pairs referred to the SDU 24. The four pairs of wires provide bi-directional balanced transport for 256 peripheral port data and signaling channels. The two pairs in each direction, operate together as a single logical channel. Clock and synchronization information is embedded in the data stream.

As previously discussed in connection with FIG. 4, the SDU 24 supports redundant operation. In a redundant configuration, one SDU acts as the telephony bus timing master, and the other acts as the telephony bus slave. The slave device synchronizes its telephony bus timing to track that of the master +/−28 nsec's as measured at the telephony busses. Upon switchover, the SDU which has transitioned from the slave condition to the master condition will gradually adjust the telephony bus timing such that it is a fixed average offset from the receive link timing. The adjustment rate is no less than 20 nsec's/sec, and no more than 42 nsec's/sec.

A redundant serial peripheral link requires a Serial S-Link interface on each of two common controls, a Serial S-Link interface on each of two SDU's, and the two associated Serial S-Link Cables. An SDU 24 drives the peripherals to which it is connected, if and only if: 1) the host telephony controller is ACTIVE, 2) the SDU is synchronized, and Ready, 3) the host telephony controller enables the SDU, and 4) no other SDU retains control of the telephony busses.

1. SDU Display

Each SDU 24 includes four seven segment displays on the front panel, arranged in two groups; one group, indicating the shelf number of the lower shelf in a shelf pair, and the other group indicating the number of the upper shelf. The shelf numbers are generated and maintained by the system to aid maintenance support in identifying the appropriate shelf to be serviced.

2. Digital Clock Synchronizing

With reference to FIG. 13, the digital clock 80 of FIG. 12 regenerates an image of the TSA transmit clock and comprises a clock/data separator, a receive bit cell counter and a low gain digital phase locked loop.

The receive bit cell counter integrates the output signal from the clock/data separator and periodically evaluates the integral. More specifically, a comparator 84 receives the data and a clock reference signal and provides an error signal which is passed through a counter 86, a short term accumulator 88 and a long term accumulator 90, and provides an overflow or underflow output signal to the clock adjustment circuit 92. The phase integrator gain is very low so that the loop damping is quite high and suppresses any significant frequency overshoot. The frequency response of the phase integrator is very low.

The clock adjustment circuit consists of a modulo 3/4/5 ring counter which adjusts each time an overflow or underflow data transisition occurs. The output signal from the ring counter 92 is fed back to the analog PLL 94 which supplies the reference signal to the comparator 84.

D. Alarm Board/Subplane

The Alarm Card 90 illustrated in FIGS. 1B and 1C is a PCBA assembly which affixes to the rear side of a UTS backplane via the alarm card connector 18 on the Alarm sub-plane 16. The Alarm Card 90 mounts perpendicularly to the Alarm sub-plane and is supported by fasteners located on the UTS side frame. The Alarm card interfaces include a 64-pin connector mounted on the Alarm sub-plane 16 used to terminate logic and monitoring signals and two RJ-45 connectors used for customer input and output.

The Alarm Card 90 provides user trunk bypass and ringing cut-off switches, terminates connections to shelf and cabinet level alarm functions, provides mounting space for a ringing generator, DC to AC converter, and provides power for a low-voltage system modem.

Further, the Alarm Card 90 reports local shelf alarm conditions and adjacent shelf alarm conditions to the local SDU 24. The SDU 24 combines the Alarm card data with link alarm information in overhead channels to the common control. Each alarm condition consumes a bit in one of four bytes to each of two shelves. The eight bytes provide information as to power supply and temperature status, user controls status, pedestal status, and system major and minor alarm loop back to both shelves.

System wide notification of four degrees of alarms, i.e., critical, major, minor, and trunk bypass, occurring within the system is provide by four LEDs mounted on the power supply board(s) inserted in each shelf in the positions as illustrated in FIGS. 1 and 2.

E. Power Supply Packaging And Thermal Management

As previously illustrated in FIG. 1, the UTS shelf provides two slots for power supply boards. The power supply boards used in the UTS are approximately one half the size of the other cards in the shelf and are arranged vertically one above the other making efficient use of packaging space by utilizing the dual slot space between the two cards. Further, as illustrated in FIGS. 1 and 2, the power supplies are located adjacent to one side of the shelf with the component side of the printed circuit board oriented toward the metal outside of the shelf and away from the other cards. This orientation may facilitate heat transfer to the metal side of the shelf and provide a thermal shield for the line cards, while defining a passageway for cooling air upward through the shelf.

F. Connector Locking Mechanism

Figure 14:
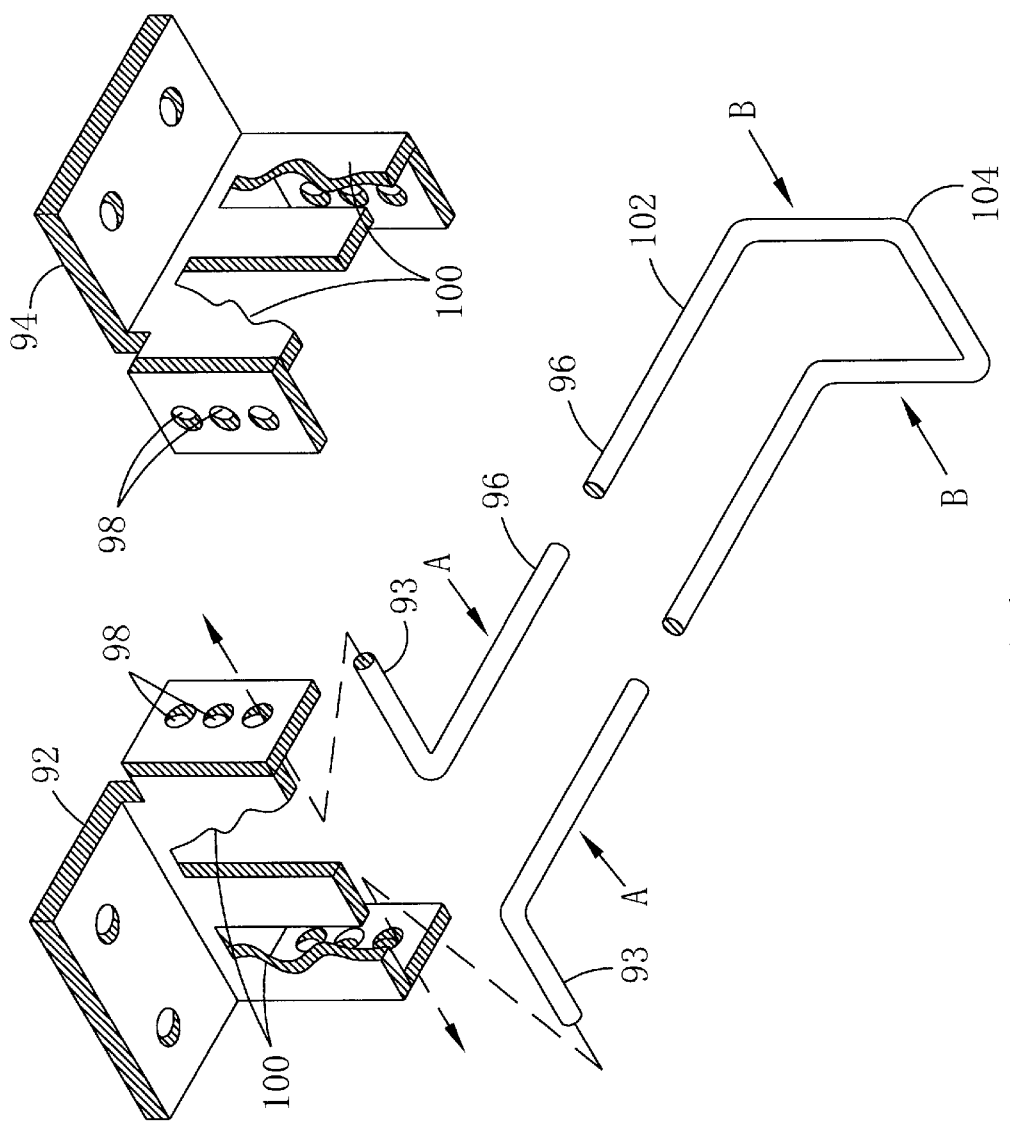
FIG. 14 is an exploded pictorial drawing of the connector locking mechanism of the present invention.
Figure 15:
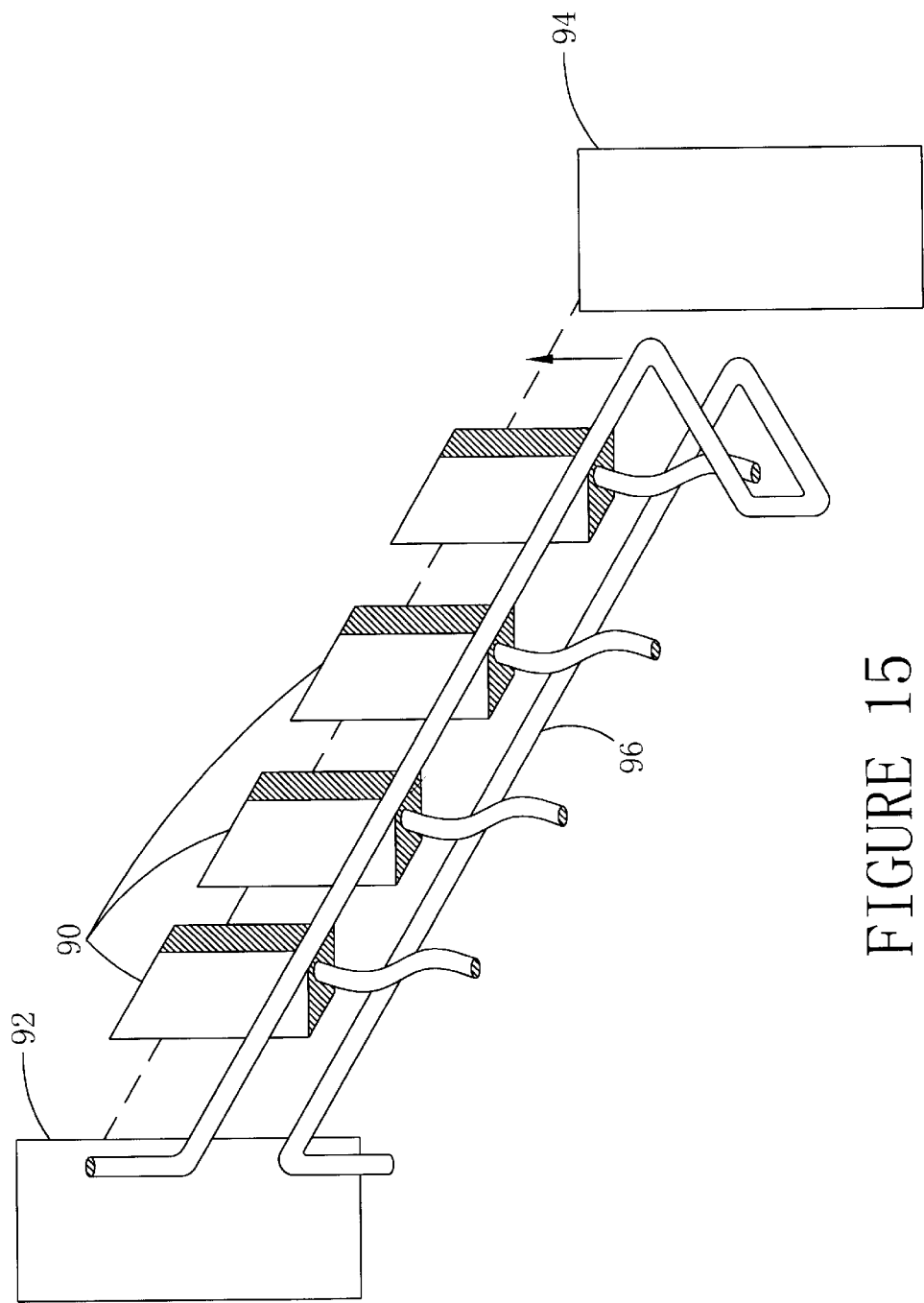
FIG. 15 is a pictorial representation of the operation of the locking mechanism of FIG. 14.

As shown in FIGS. 14 and 15, a mechanical latching mechanism is supplied to retain the hooded connectors of the line cards in place.

As shown schematically in FIG. 15, each of the line cards has a 25 pair connector onto which a hooded connector 90 may be placed. The present invention offers a single latching mechanism for all of the hooded connectors.

As shown in FIG. 14, a latch 92,94 is mounted on the shelf on both sides of the line cards. Each latch 92 includes a series of parallel apertures adapted to receive the free ends 93 of a latching bar 96 which acts as a spring and thus may be manually squeezed together as shown in the arrows A—A and released to expand into a selected one of the opposing aperture pairs 98.

Each latch 92, 94 also is provided with two slots 100 notched to selectively receive the closed end 102 of the latching bar 96. The closed end 102 of the latching bar 96 is desirably provided with an extension 104 which, when manually squeezed in the direction of the arrows B—B, facilitates entry of the bar 96 into a selected pair of notches 100 in the latch.

In operation as shown in FIG. 15, the free ends of the bar 96 are inserted into a selected pair of the apertures in a selected one of the latches 92 and the bar pivoted to exert pressure against the backs of each of the hooded connectors 90. The flex in the bar 96 and the resiliency of the hooded connectors 90 insures that pressure will be maintained against the connectors 90. The bar 96 is retained in the closed position by insertion of the closed end thereof into a selected pair of notches in the other latch 94.

II. Typical Installation And Redundancy

Figure 3:
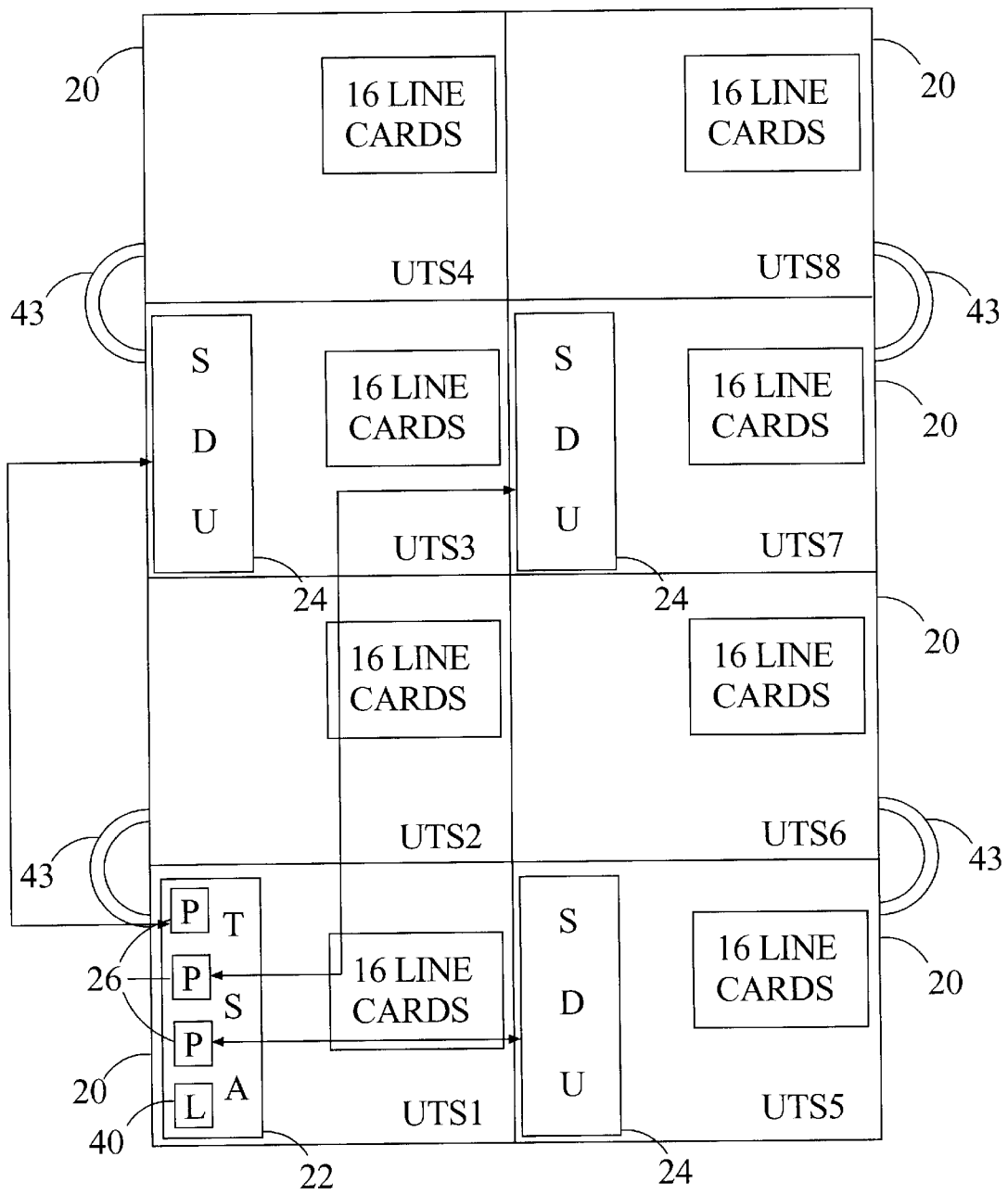
FIG. 3 is a functional block diagram of a typical 2K port embodiment of the system present invention illustrating the modular nature and expansion capabilities of the UTS.

A typical eight shelf system cabinet is illustrated in FIG. 3 where four UTS shelf pairs are connected to provide a 2K port system. As illustrated, the cabinet includes one shelf pair UTS1–UTS2 containing a TSA card on the lower shelf UTS1 and three shelf pairs UTS3–UTS4, UTS5–UTS6 and UTS7–UTS8 containing SDU cards in the lower shelves. The upper shelf of each shelf pair is reserved solely for TIU cards and power supplies; no TSA or SDU cards are inserted in these upper shelves. Sixteen TIU cards are inserted in each of the eight shelves.

As illustrated, the shelves are connected in pairs by cabling 43 from the alarm sub-plane 16 as described in connection with FIG. 2 with each shelf pair including either the TSA card 22 of FIG. 5 or an SDU 24 card of FIG. 12.

For the first shelf pair UTS1–UTS2, the LPI 40 of the TSA card 22 controls the line cards in both shelves to provide 512 ports. The TSA card 22 is also connected via one of the three PAMs 26 to the SDU 24 associated with each of the other shelf pairs, e.g., the uppermost PAM 26 to the SDU 24 on shelf UTS 3.

The universality of the telephony shelf is a significant advantage in achieving the particular degree of redundancy desired. While redundancy in an individual unmodified UTS is limited to a redundant power supply, redundancy at the shelf pair level is available as illustrated in FIG. 4A. In this case, a TSA (for a common equipment pair) is inserted in each shelf of the shelf pair with line cards available in one or both shelves of the shelf pair. The TSAs are connected through redundant cabling 47 via the redundancy connectors 45 of the Alarm Sub-plane (See FIG. 2B). One TSA is identified as the active TSA with the second TSA acting in a standby capacity. If the active TSA should fail, the standby TSA takes control of the system. This redundancy scheme is also applicable to a peripheral shelf pair with each of the TSAs replaced by an SDU.

As illustrated in FIG. 4B, an alternative redundancy scheme is available for the peripheral equipment shelves. By slightly modifying a connector of the UTS, a second SDU may be inserted in the same UTS shelf. As previously mentioned, when a UTS is used for common equipment, the CPU card is inserted in a slot next to the TSA card; however, for peripheral equipment this slot is left vacant. Adapting the CPU connector to allow insertion of an SDU card provides redundancy between the two SDUs in a single shelf.

Figure 4C:
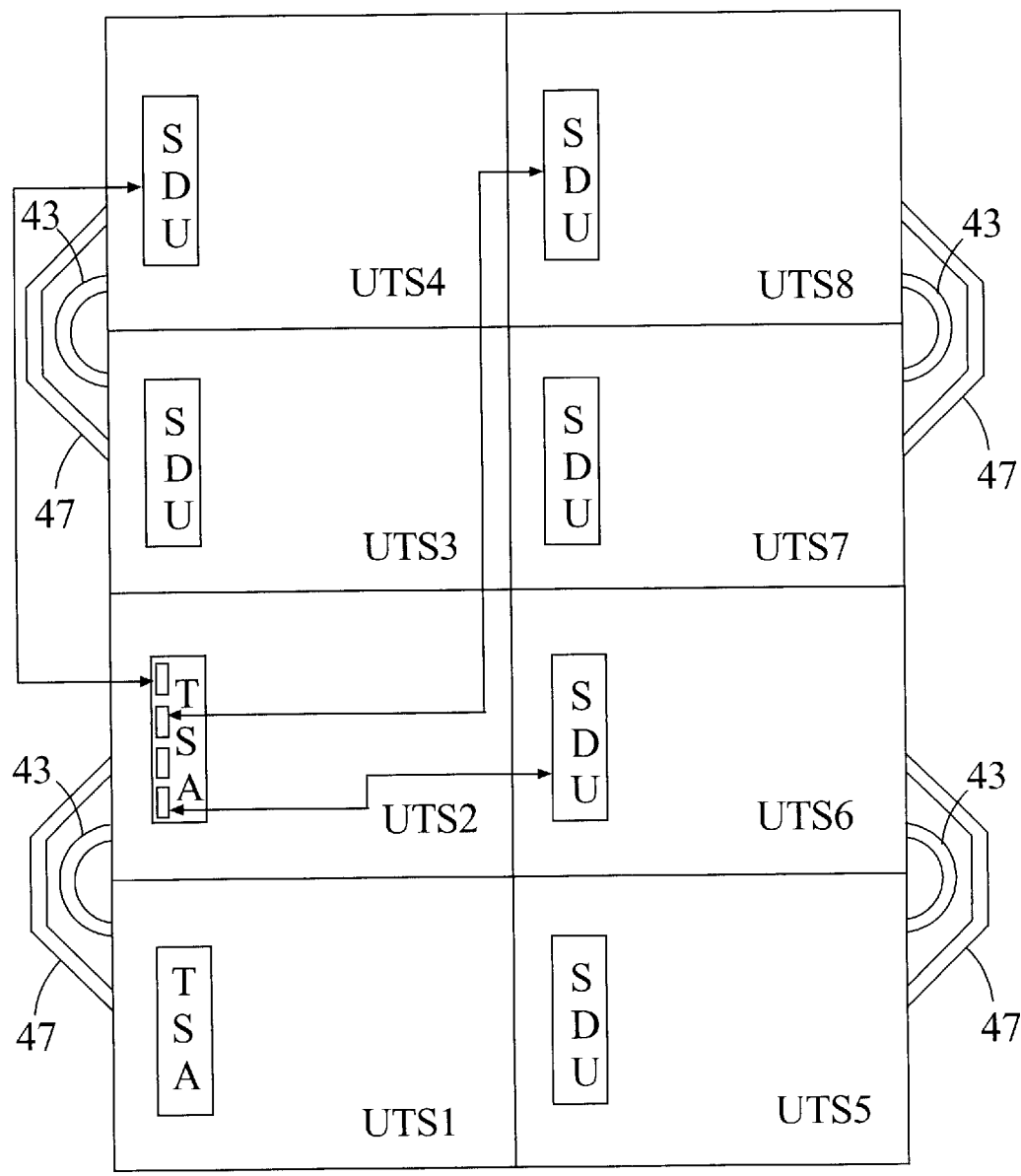

As shown in FIG. 4C, system redundancy may be accomplished for the 2K port system of FIG. 3 by inserting a TSA card or SDU cards into the second shelf of the common equipment shelf pair or the peripheral equipment shelf pairs respectively. As with the system shown in FIG. 3, the second shelf TSA of the common equipment shelf pair is connected to the second shelf SDUs of the peripheral shelf pairs via the PAMs located on the second shelf TSA (for clarity, the connections of the primary system are not shown). When any module fails in the primary system (i.e., first shelf connections as describe in FIG. 3), the secondary system detects the failure and the associated TSA and SDUs take control of the line cards for the corresponding shelf pairs.

III. Expansion Of Legacy Switches

The SDU may also provide transport interface between peripheral shelves and the 20-20 Lx Common Control module.

The 20-20 Lx switch has the capacity for servicing 10K ports. However, it is often installed in systems which need less than the maximum number of ports at the time of installation. Should there come a time when additional capacity is desired, the UTS of the present invention, with an SDU installed in each shelf pair, may be used to add ports in 256 port increments (single shelf) or 512 port increments (paired shelves).

The interface between the common control of the 20-20 Lx switch and the additional ports can be provided by replacing the Peripheral Interface Unit ("PIU") of the 20-20 Lx with a Peripheral Transfer Unit ("PTU") containing two PAMs as earlier described.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a telephone switching system having plural field programmable gate arrays (FPGAs) resident on a printed circuit board (PCB) and programmed from a source external of the PCB, a method of configuring the FPGAs comprising the steps of:

(a) providing a flash memory device resident on the PCB;

(b) programming a preselected one of the plural FPGAs to function as a serial to parallel converter and flash memory controller;

(c) provide the programmed one of the plural FPGAs from a source external of the PCB with the information needed to program the flash memory device; and (d) reprogramming the preselected one of the FPGAs and programming the remaining ones of the plurality of FPGAs from the flash memory device.

2. In a telephone switching system, a method of configuring field programmable gate arrays (FPGA) resident on a printed circuit board (PCP) installed within the system comprising:

(a) programming a flash memory device resident on the PCB using an FPGA resident on the PCB from an external computer; and, (b) upon completion of the programming of the flash memory, programming all the FPGAs resident on the PCB from the flash memory device.

3. The method of claim 2 wherein the step of programming the flash memory device comprises:

(a) providing a parallel connection between a flash memory device and a preselected FPGA resident on the PCB;

(b) serially connecting an external computer to the preselected FPGA;

(c) configuring the preselected FPGA to program the flash memory from the external computer via the serial connection;

(d) transmitting programming data for the flash memory device to the first FPGA from the external computer;

(e) programming the flash memory device by the FPGA.

4. In a telephone switching system, a method of configuring field programmable gate arrays (FPGAs) resident on a printed circuit board using a flash memory device, the improvement comprising using a flash memory device to reconfigure an FPGA wherein the flash memory device is programmed via information received from an external computer operatively connected to the FPGA and wherein the information received from the external computer configures the FPGA to function as an Universal Asynchronous Receiver/Transmitter (UART) and a flash memory programmer.

5. The method of claim 4 wherein the information received from the external computer further includes programming data to be provided to the flash memory device.

6. The method of claim 4 wherein the flash memory device is used to configure all the FPGAs on the PCB.

7. A method for the In System Programming of a flash memory device comprising:
  (a) providing a parallel connection between a flash memory device and at least one field programmable gate array (FPGA) on a printed circuit board (PCB);
  (b) serially connecting an external computer to a first FPGA on the PCB;
  (c) configuring the first FPGA to function as a Universal Asynchronous Receiver Transmitter (UART) and a flash memory programmer using the external computer via the serial connection;
  (d) transmitting programming data for the flash memory device to the first FPGA from the external computer;
  (e) generating within the first FPGA using the flash memory programmer function control information needed to program the flash memory device;
  (f) performing serial to parallel conversion on received programming data within the first FPGA using UART function; and,
  (g) transmitting the converted programming data and control information to the flash memory device from the first FPGA, thereby programming the flash memory device.

* * * * *